US009197573B2

(12) United States Patent
Cho

(10) Patent No.: US 9,197,573 B2
(45) Date of Patent: Nov. 24, 2015

(54) APPARATUS AND METHOD FOR CONTROLLING DATA TRANSMISSION IN A WIRELESS COMMUNICATION SYSTEM

(75) Inventor: Kyung-rae Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/510,883

(22) PCT Filed: Nov. 18, 2010

(86) PCT No.: PCT/KR2010/008154
§ 371 (c)(1),
(2), (4) Date: May 18, 2012

(87) PCT Pub. No.: WO2011/062423
PCT Pub. Date: May 26, 2011

(65) Prior Publication Data
US 2012/0269062 A1 Oct. 25, 2012

(30) Foreign Application Priority Data

Nov. 18, 2009 (KR) ........................ 10-2009-0111552

(51) Int. Cl.
*H04L 12/24* (2006.01)
*H04L 12/825* (2013.01)
*H04L 12/801* (2013.01)
(52) U.S. Cl.
CPC .............. *H04L 47/263* (2013.01); *H04L 47/14* (2013.01)
(58) Field of Classification Search
CPC .................................................... H04L 47/14

USPC .......... 370/229, 235, 352, 468; 455/69, 422.1
See application file for complete search history.

(56) References Cited

U.S. PATENT DOCUMENTS 8,000,249 B2* 8/2011 Nagy et al. .................... 370/236
8,315,644 B2* 11/2012 Lundh et al. .................. 455/453
(Continued)

FOREIGN PATENT DOCUMENTS

EP           1786234 A2 *  5/2007  .............. H04Q 7/38
KR   10-2005-0068433         7/2005
KR   10-2007-0042753         4/2007

OTHER PUBLICATIONS

International Search Report dated Aug. 2, 2011 in connection with International Patent Application No. PCT/KR2010/008154.
(Continued)

*Primary Examiner* — Parth Patel

(57) ABSTRACT

An apparatus and method is provided for controlling data transmission considering congestion in a wired transmission section in a wireless communication system. To this end, a reception device reports, to a transmission device, status information about a congestion status and flag information indicating occurrence of a new congestion status or maintenance of an existing congestion statue. The transmission device reduces throughput of data being transmitted through the wired transmission section, if it is determined from the flag information reported by the reception device that a new congestion status has occurred or the existing congestion status has been being maintained for a predetermined time. The transmission device requests the reception device to report a congestion status, if the congestion status is not released until a lapse of a predetermined time after occurrence of a new congestion status.

18 Claims, 5 Drawing Sheets

(56) References Cited

U.S. PATENT DOCUMENTS

| | | | |
|---|---|---|---|
| 8,520,517 B2* | 8/2013 | Kwan et al. | 370/231 |
| 2002/0136162 A1* | 9/2002 | Yoshimura et al. | 370/229 |
| 2002/0145976 A1* | 10/2002 | Meyer et al. | 370/235 |
| 2003/0026207 A1* | 2/2003 | Loguinov | 370/235 |
| 2003/0139145 A1* | 7/2003 | Lee et al. | 455/69 |
| 2003/0198184 A1* | 10/2003 | Huang et al. | 370/231 |
| 2005/0108444 A1* | 5/2005 | Flauaus et al. | 710/15 |
| 2005/0190748 A1* | 9/2005 | Nguyen et al. | 370/352 |
| 2006/0188079 A1* | 8/2006 | Tu et al. | 379/210.01 |
| 2006/0253622 A1* | 11/2006 | Wiemann et al. | 710/52 |
| 2008/0056125 A1 | 3/2008 | Kneckt et al. | |
| 2009/0028186 A1* | 1/2009 | Schmidt et al. | 370/468 |
| 2009/0073882 A1* | 3/2009 | McAlpine et al. | 370/235 |
| 2009/0201810 A1* | 8/2009 | Kazmi et al. | 370/232 |
| 2009/0239520 A1* | 9/2009 | Inagaki et al. | 455/422.1 |
| 2010/0027547 A1* | 2/2010 | Shinozaki | 370/394 |
| 2010/0034087 A1* | 2/2010 | De Benedittis et al. | 370/235 |
| 2010/0061324 A1* | 3/2010 | Liao et al. | 370/329 |
| 2010/0067383 A1* | 3/2010 | Nagy et al. | 370/236 |
| 2010/0238803 A1* | 9/2010 | Racz et al. | 370/235 |
| 2010/0238805 A1* | 9/2010 | Ludwig et al. | 370/236 |
| 2010/0254262 A1* | 10/2010 | Kantawala et al. | 370/232 |
| 2011/0044168 A1* | 2/2011 | N Das et al. | 370/232 |
| 2011/0218006 A1* | 9/2011 | Hanaki et al. | 455/509 |

OTHER PUBLICATIONS

Written Opinion of International Searching Authority dated Aug. 2, 2011 in connection with International Patent Application No. PCT/KR2010/008154.

3GPP TS 25.435 V9.4.0, "3rd Generation Partnership Project; Technical Specification Group Radio Access Network UTRAN Iub Interface User Plane Protocols for Common Transport Channel Data Streams", Release 9, Jun. 2011, 61 pages.

* cited by examiner

← → WIRED TX SECTION
←---→ WIRELESS TX SECTION

| Spare bits 7-3 | Congestion Status | New Flag | CmCH-PI |
|---|---|---|---|
| Maximum MAC-d PDU Length ||||
| Maximum MAC-d PDU Length (cont) ||| HS-DSCH Credits |
| HS-DSCH Credits (cont) ||||
| HS-DSCH Interval ||||
| HS-DSCH Repetition Period ||||
| Spare Extension ||||

7                                                                            0

APPARATUS AND METHOD FOR CONTROLLING DATA TRANSMISSION IN A WIRELESS COMMUNICATION SYSTEM

CROSS-REFERENCE TO RELATED APPLICATION(S)

The present application claims priority under 35 U.S.C. §365 to International Patent Application No. PCT/KR2010/008154 filed Nov. 18, 2010, entitled "APPARATUS AND METHOD FOR CONTROLLING DATA TRANSMISSION IN A WIRELESS COMMUNICATION SYSTEM". International Patent Application No. PCT/KR2010/008154 claims priority under 35 U.S.C. §365 and/or 35 U.S.C. §119(a) to Korean Patent Application No. 10-2009-0111552 filed Nov. 18, 2009 and which are incorporated herein by reference into the present disclosure as if fully set forth herein.

TECHNICAL FIELD

The present invention relates generally to an apparatus and method for controlling data transmission in a wireless communication system, and more particularly, to an apparatus and method for controlling data transmission considering congestion in a wired transmission section in a wireless communication system.

BACKGROUND ART

General, in a wireless communication system, a data transmission section is divided into a wired transmission section where data is transmitted over a wired network, and a wireless transmission section where data is transmitted over a wireless network. For example, the wired transmission section may refer to a transmission section between a Node B (or a Base Station (BS)) and a Controlling Radio Network Controller (CRNC) (or a BS controller), while the wireless transmission section may refer to a transmission section between a Node B and User Equipments (UEs) (or Mobile Stations (MSs)).

The wireless communication system includes a wireless communication system supporting Wideband Code Division Multiple Access (W-CDMA) (hereinafter referred to as a 'W-CDMA system'), a typical example capable of transmitting voice, circuit data, and packet data.

Meanwhile, a wireless communication system provides high-speed packet data services over a Down Link (DL) upon request of users. In particular, the W-CDMA system supports High Speed Downlink Packet Access (HSDPA) for high-speed transmission of packet data over the DL.

The high-speed packet data services provided in the wireless communication system have burst characteristics. Therefore, congestion caused by the high-speed packet data services may occur in the wired transmission section where a data Band Width (B/W) is limited. The occurrence of congestion in the wired transmission section may lead to degradation of transmission quality due to a loss or a delay of packet data.

Therefore, measures to prevent congestion from occurring in the wired transmission section are required in a wireless communication system.

DISCLOSURE OF INVENTION

Summary

An aspect of the present invention is to address at least the above-mentioned problems and/or disadvantages and to provide at least the advantages described below. Accordingly, an aspect of exemplary embodiments of the present invention is to provide an apparatus and method for allowing a transmission device to adjust throughput of data according to a congestion status having occurred in a wired transmission section, and a wireless communication system supporting the same.

Another aspect of exemplary embodiments of the present invention is to provide an apparatus and method for allowing a transmission device to recognize new occurrence of a congestion status and/or maintenance of an existing congestion status in a wired transmission section, and a wireless communication system supporting the same.

Another aspect of exemplary embodiments of the present invention is to provide an apparatus and method for allowing a transmission device to reduce throughput of data only when a congestion status in a wired transmission section is being maintained for a predetermined time, and a wireless communication system supporting the same.

Another aspect of exemplary embodiments of the present invention is to provide an apparatus and method in which a transmission device requests a reception device to report a congestion status when a congestion status is not released until a lapse of a predetermined time after occurrence of a new congestion status, and a wireless communication system supporting the same.

Solution to Problem

In accordance with one aspect of the present invention, a method is provided for controlling data transmission by a transmission device in a wired transmission session in a wireless communication network. The method includes, upon receiving from a reception device a report indicating occurrence of a new congestion status in the wired transmission section, reducing throughput of data being transmitted to the reception device through the wired transmission section; and upon receiving from the reception device a report indicating maintenance of a congestion status in the wired transmission section, reducing throughput of data being transmitted to the reception device through the wired transmission section if the congestion status has been being maintained for a predetermined time.

In accordance with another aspect of the present invention, a method is provided for controlling data transmission performed by a transmission device in a reception device in a wired transmission section in wireless communication network. The method includes checking a congestion status in the wired transmission section in receiving data from the transmission device through the wired transmission section; upon detecting occurrence of a new congestion status through the check, reporting to the transmission device the occurrence of the new congestion status in the wired transmission section; and upon detecting maintenance of an existing congestion status through the check, reporting to the transmission device the maintenance of the existing congestion status in the wired transmission section.

In accordance with another aspect of the present invention, a wireless communication system is provided for controlling data transmission in a wired transmission section. The wireless communication system includes a reception device for checking occurrence of a new congestion status or maintenance of an existing congestion status in receiving data through the wired transmission section, and reporting flag information for identifying the occurrence of a new congestion status or the maintenance of an existing congestion status according to the check results; and a transmission device for reducing throughput of data being transmitted through the wired transmission section if a report including flag information corresponding to occurrence of a new congestion status is received from the reception device, and upon receiving from the reception device a report including flag information corresponding to maintenance of an existing congestion status, reducing throughput of data being transmitted through the wired transmission section if the congestion status is being maintained for a predetermined time.

Advantageous Effects of Invention

As is apparent from the foregoing description, according to exemplary embodiments of the present invention, a reception device may effectively report a congestion status occurring in the wired transmission section, and a transmission device may efficiently adjust data throughput according to the congestion status. In addition, the transmission device may provide an optimal data rate according to the status of the wired transmission section, facilitating efficient use of a bandwidth in the wired transmission section.

Meanwhile, various other effects have been disclosed explicitly or implicitly in the foregoing description of exemplary embodiments of the present invention.

DETAILED DESCRIPTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A detailed description will now be made of measures to allow a transmission device to adjust throughput of data by accurately reflecting a status of a wired transmission section according to an embodiment of the present invention.

To this end, upon detecting a congestion status in the wired transmission section, a reception device reports congestion status information indicating occurrence of the congestion status to the transmission device. The reception device reports even the information indicating whether the occurrence of the congestion status corresponds to new occurrence of a congestion status, or to maintenance of the existing congestion status.

The transmission device reduces throughput of data if a report indicating new occurrence of a congestion status is received from the reception device, or if a report indicating maintenance of the existing congestion status is continuously received for a predetermined time. On the other hand, the transmission device increases throughput of data if a report indicating occurrence of a congestion status is not received from the reception device for a predetermined time.

Besides, the transmission device requests the reception device to report the current congestion status if a report indicating release of a congestion status is not received for a predetermined time after the congestion status was reported.

An embodiment of the present invention will now be described in detail with reference to the accompanying drawings.

Figure 1:
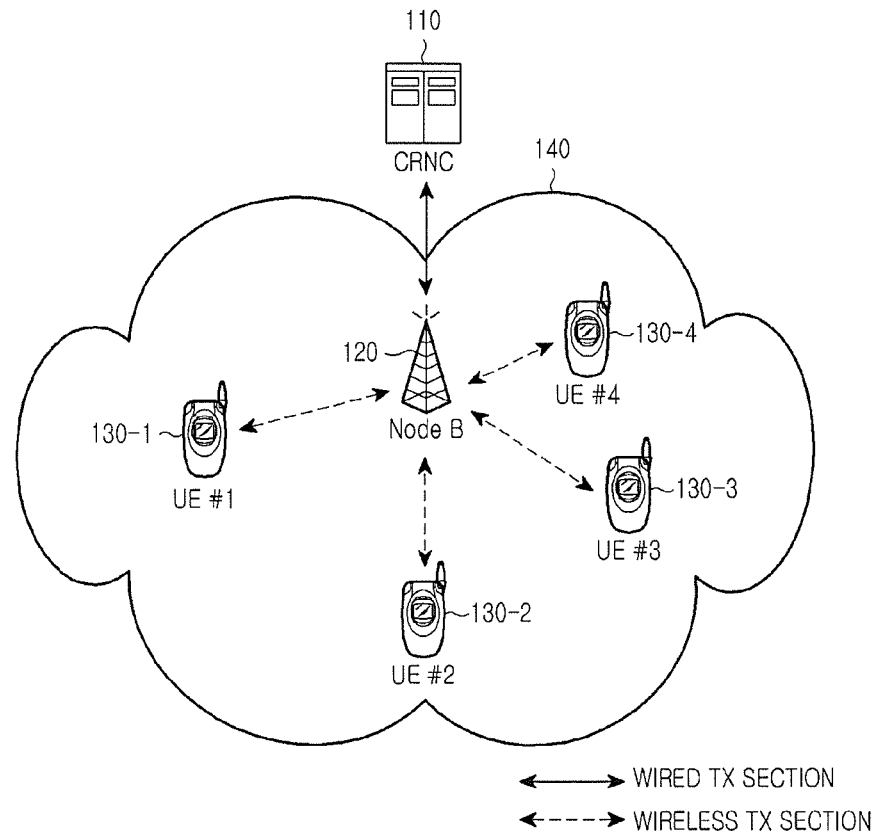
FIG. 1 is a diagram showing a configuration of a wireless communication system as an example of a communication system according to an embodiment of the present invention.

FIG. 1 shows a configuration of a wireless communication system as an example of a communication system according to an embodiment of the present invention.

Referring to FIG. 1, a transmission section between a CRNC 110 and a Node B 120 is managed as a wired transmission section, while a transmission section between the Node B 120 and UEs 130-1 to 130-4 in its coverage is managed as a wireless transmission section.

The Node B 120 receives DL data from the CRNC 110 through the wired transmission section, and forwards the received DL data to a relevant UE through the wireless transmission section.

It is common that a bandwidth is restricted in the wired transmission section where data is transmitted between the CRNC 110 and the Node B 120. Therefore, when transmitting packet data having burst characteristics such as characteristics of HSDPA, the wired transmission section may suffer from congestion caused by transmission of the packet data. The congestion in the wired transmission section may lead to not only a delay of data but also a loss of data, causing degradation of transmission quality of data.

Thus, to minimize the occurrence of congestion in the wired transmission section, a reception side of the wired transmission section recognizes the occurrence of congestion and reports the recognition to a transmission side, and the transmission side is adapted to adjust throughput of data in response to the report from the reception side.

To this end, in an embodiment of the present invention, the Node B 120 monitors a congestion status of the wired transmission section and reports congestion status information indicating occurrence/non-occurrence of a congestion status and a cause of occurrence of the congestion status, and flag information indicating a cause of a congestion status, to the CRNC 110 according to the monitoring results. An embodiment of the present invention newly defines a control frame message (hereinafter referred to as a 'congestion status report message') with which the Node B 120 reports the congestion status information and the flag information to the CRNC 110.

Based on the congestion status information and flag information reported by the Node B 120, the CRNC 110 adjusts throughput of data being transmitted through the wired transmission section.

For example, the CRNC 110 reduces throughput of data, upon receiving from the Node B 120 a report indicating occurrence of a new congestion status or a report indicating that the existing congestion status has lasted for a predetermined time. On the other hand, the CRNC 110 increases throughput of data if a report indicating occurrence of a congestion status is not received from the Node B 120 for a predetermined time.

Meanwhile, the CRNC 110 requests the Node B 120 to report the current congestion status, if a report indicating release of a congestion status is not received from the Node B 120 until a lapse of a predetermined time after occurrence of a new congestion status. Therefore, an embodiment of the present invention newly defines a control frame message (hereinafter referred to as a 'congestion status report request message') with which the CRNC 110 requests the Node B 120 to report a congestion status.

All types of control frame messages transmittable between the Node B 120 and the CRNC 110 are defined in Table 1 below.

TABLE 1

| Type of control frame | Value |
|---|---|
| OUTER POWERCONTROL | 0000 0001 |
| TIMING ADJUSTMENT | 0000 0010 |
| DL SYNCHRONISATION | 0000 0011 |
| UL SYNCHRONISATION | 0000 0100 |
| Reserved Value | 0000 0101 |
| DL NODE SYNCHRONISATION | 0000 0110 |
| UL NODE SYNCHRONISATION | 0000 0111 |
| DYNAMIC PUSCH ASSIGNMENT | 0000 1000 |
| TIMING ADVANCE | 0000 1001 |
| HS-DSCH Capacity Request | 0000 1010 |
| HS-DSCH Capacity Allocation TYPE 1 | 0000 1011 |
| HS-DSCH Capacity Allocation TYPE 2 | 0000 1100 |
| HS-DSCH TNL Congestion Status Report | 0000 1101 |
| HS-DSCH TNL Congestion Status Request | 0000 1110 |

In accordance with Table 1, "0000 1101" is defined as a value indicating a congestion status report message 'HS-DSCH TNL Congestion Status Report', and "0000 1110" is defined as a value indicating a congestion status report request message 'HS-DSCH TNL Congestion Status Request'.

Figure 5:
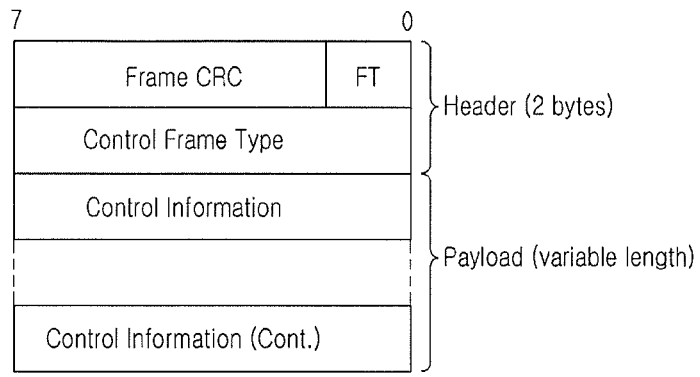
FIG. 5 is a diagram showing a structure of a control frame message according to an embodiment of the present invention.

A structure of a control frame message transmitted between the Node B 120 and the CRNC 110 is shown in FIG. 5. Referring to FIG. 5, the control frame message includes a 2-byte header and a variable-length payload.

The header of the control frame message has a control frame type field in which a value defining a type of the control frame message is recorded. Thus, in the case of a congestion status report message transmitted by the Node B 120 for an embodiment of the present invention, "0000 1101" is recorded in the control frame type field, whereas in the case of a congestion status report request message transmitted by the CRNC 110 for an embodiment of the present invention, "0000 1110" is recorded in the control frame type field.

Meanwhile, the payload of the control frame message includes control information for a field structure defined in accordance with a type of the control frame message.

Figure 6:
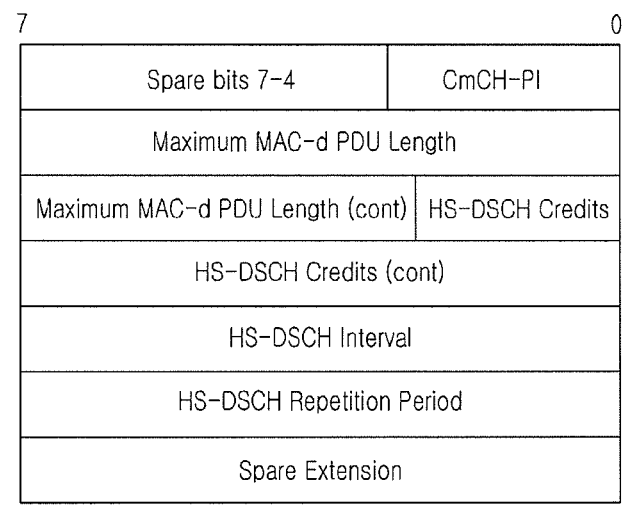
FIG. 6 is a diagram showing a structure of a payload constituting a first-type capacity allocation message according to an embodiment of the present invention.

FIG. 6 shows a structure of a payload constituting a first-type capacity allocation message 'HS-DSCH Capacity Allocation TYPE 1' defined as a value "0000 1011" in Table 1. It is noted from FIG. 6 that the payload includes fields in which the CRNC 110 records parameters required for determining throughput of data.

Figure 7:
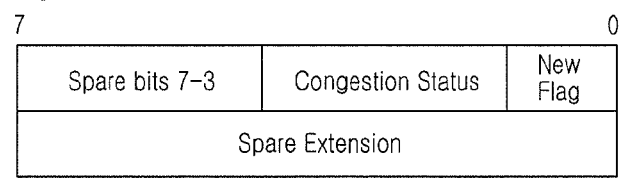
FIG. 7 is a diagram showing a structure of a payload constituting a congestion status report message newly defined for an embodiment of the present invention.

FIG. 7 shows a structure of a payload constituting a congestion status report message newly defined for an embodiment of the present invention.

Referring to FIG. 7, a payload of a congestion status report message transmitted by the Node B 120 to the CRNC 110 includes fields for transmitting congestion status information and flag information.

The congestion status information may include two bits, and different congestion statuses corresponding to values expressible with the two bits may be defined as in Table 2 below.

TABLE 2

| Congestion status information | Congestion status |
|---|---|
| 00 | No TNL Congestion |
| 01 | Reserved for future use |
| 10 | TNL Congestion - detected by delay build-up |
| 11 | TNL Congestion - detected by frame loss |

In accordance with a definition of Table 2, congestion status information="00" and "01" corresponds to non-occurrence of congestion in the wired transmission section, whereas congestion status information="10" and "11" corresponds to occurrence of congestion in the wired transmission section.

In addition, the congestion status information="10" indicates the congestion that has occurred in the wired transmission section due to a transmission delay of data, whereas the congestion status information="11" indicates the congestion that has occurred in the wired transmission section due to a loss of data.

Therefore, based on the congestion status information in a congestion status report message received from the Node B 120, the CRNC 110 may determine occurrence/non-occurrence of a congestion status in the wired transmission section, and if the congestion status has occurred, determine a cause of the occurrence.

However, the CRNC 110 may not determine whether the current congestion status corresponds to new occurrence of a congestion status or to maintenance of the existing congestion status, depending on only the congestion status information.

Therefore, a flag field is newly defined in the payload of the congestion status report message according to an embodiment of the present invention to identify whether a congestion status has newly occurred or the existing congestion status is being maintained. Flag information provided in the flag field may include one bit, and meanings of values expressible with the one bit may be defined as in Table 3 below.

TABLE 3

| Flag information | Status |
|---|---|
| 0 | Transmission of previous congestion status (maintenance of existing congestion status) |
| 1 | Occurrence of new congestion status |

In accordance with Table 3, flag information="0" means maintenance of the previously occurred congestion status, while flag information="1" means occurrence of new congestion in a no-congestion status.

As is apparent from the foregoing description, upon receiving a congestion status report message from the Node B 120, the CRNC 110 may determine whether the wired transmission section is in a congestion status, and if so, determine what the cause of the congestion is. In addition, based on the congestion status report message, the CRNC 110 may determine whether the congestion status in the wired transmission section corresponds to new occurrence of a congestion status or maintenance of the existing congestion status.

Hence, the CRNC 110 determines whether to adjust throughput of data depending on the congestion status report message received from the Node B 120. For example, the CNRC 110 immediately reduces throughput of data for congestion status information="10" or "11" and flag information="1". However, for congestion status information="10" or "11" and flag information="0", the CRNC 110 reduces throughput of data only when a congestion status report message reporting a congestion status is continuously received for a predetermined time, an example of which is shown in FIG. 10.

Figures 9, 10:
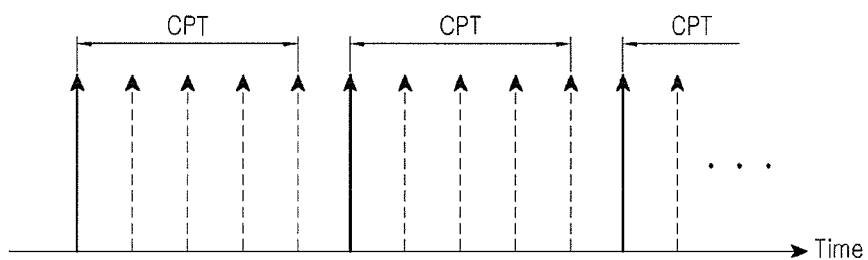
FIG. 9 is a diagram showing a structure of a payload constituting a control frame message according to an embodiment of the present invention.
FIG. 10 is a diagram showing an example for reducing data throughput with the congestion status maintained according to an embodiment of the present invention.

Referring to FIG. 10, the CRNC 110 is adapted to reduce throughput of data when a congestion status report message reporting occurrence of a congestion status is continuously received for a predetermined time.

In contrast, the CRNC 110 increases throughput of data if a congestion status report message with congestion status information="10" or "11" is continuously received for a predetermined time.

To decrease or increase data throughput as needed, the CRNC 110 should determine a decrement/increment level of the data throughput. The simplest way is to preset a decrement/increment level of the data throughput. In this case, the CRNC 110 may reduce or increase data throughput by the preset decrement/increment level whenever the data throughput needs to decrease or increase. It is not necessary that a decrement level preset for a decrease in the data throughput is identical to an increment level preset for an increase in the data throughput.

As an alternative, the CRNC 110 may use parameters provided from the Node B 120. FIG. 6 shows a structure of a payload constituting a capacity allocation message, a control frame message for providing parameters required for determining throughput of data in the CRNC 110.

However, the CRNC 110 sends a congestion status report request message to the Node B 120 if a congestion status report message reporting release of a congestion status is not provided from the Node B 120 until a lapse of a predetermined time after recognizing occurrence of a new congestion status.

Figure 8:
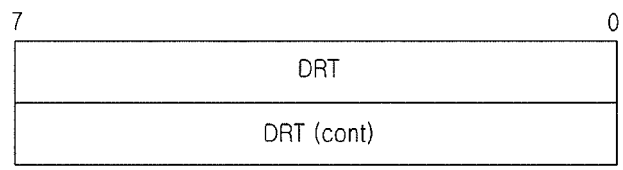
FIG. 8 is a diagram showing a structure of a payload constituting a congestion status report request message newly defined for an embodiment of the present invention.

FIG. 8 shows a structure of a payload constituting a congestion status report request message newly defined for an embodiment of the present invention. Referring to FIG. 8, a Delay Reference Time (DRT) is recorded in the payload constituting the congestion status report request message.

Upon receiving a congestion status report request message from the CRNC 110, the Node B 120 checks whether a congestion status has occurred in the wired transmission section due to a delay of data, based on a DRT value recorded in the congestion status report request message. Upon detecting a new congestion status by the check, the Node B 120 sends the CRNC 110 a congestion status report message for reporting the detection of a new congestion status. However, upon failure to detect a new congestion status through the check, the Node B 120 sends the CRNC 110 a congestion status report message reporting that the existing congestion status is being maintained.

Otherwise, if the existing congestion status is released, the Node B 120 sends the CRNC 110 a congestion status report message reporting the release of the congestion status.

The congestion status report message sent by the Node B 120 is the same in structure as the above-described congestion status report message, so its detailed description is omissible.

In the above-described embodiment of the present invention, a message for a congestion status report and a capacity allocation message are used in a separate way, by way of example. However, as an alternative example, information for reporting a congestion status and parameters for capacity allocation may be carried on a single control frame message.

As an example, FIG. 9 shows a structure of a payload constituting a control frame message. Referring to FIG. 9, it is noted that a congestion status field and a flag field are newly added to the payload structure shown in FIG. 6.

Figure 2:
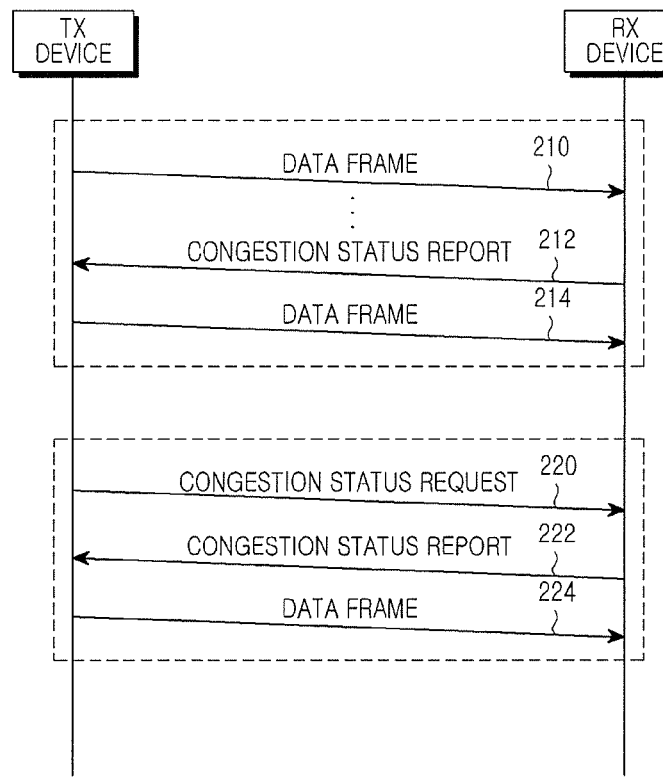
FIG. 2 is a diagram showing an example of signaling taking place between a transmission device and a reception device according to an embodiment of the present invention.

FIG. 2 shows an example of signaling taking place between a transmission device and a reception device according to an embodiment of the present invention.

Referring to FIG. 2, a transmission device transmits a data frame to a reception device through a wired transmission section (Step 210). While receiving the data frame from the transmission device, the reception device monitors whether congestion occurs in the wired transmission section due to a delay or a loss.

Based on the monitoring results, the reception device generates a congestion status report message and sends the generated congestion status report message to the transmission device (Step 212).

The transmission device receives the congestion status report message from the reception device, and determines whether there is a need to adjust throughput of data, based on congestion status information and flag information recorded in the received congestion status report message.

If there is a need to increase or decrease data throughput, the transmission device adjusts data throughput, and transmits a generated data frame to the reception device 214 at the adjusted data throughput (Step 214).

In the meantime, if a report indicating release of a newly occurred congestion status is not received from the reception device for a predetermined time, the transmission device sends a congestion status report request message to the reception device (Step 220).

Upon receiving the congestion status report request message from the transmission device, the reception device analyzes a congestion status of the wired transmission section and reports the analysis results to the transmission device using a congestion status report message (Step 222).

The transmission device receives the congestion status report message from the reception device, and adjusts data throughput as needed, based on congestion status information and flag information recorded in the received congestion status report message. The transmission device transmits a generated data frame to the reception device at the adjusted data throughput (Step 224).

Figure 3:
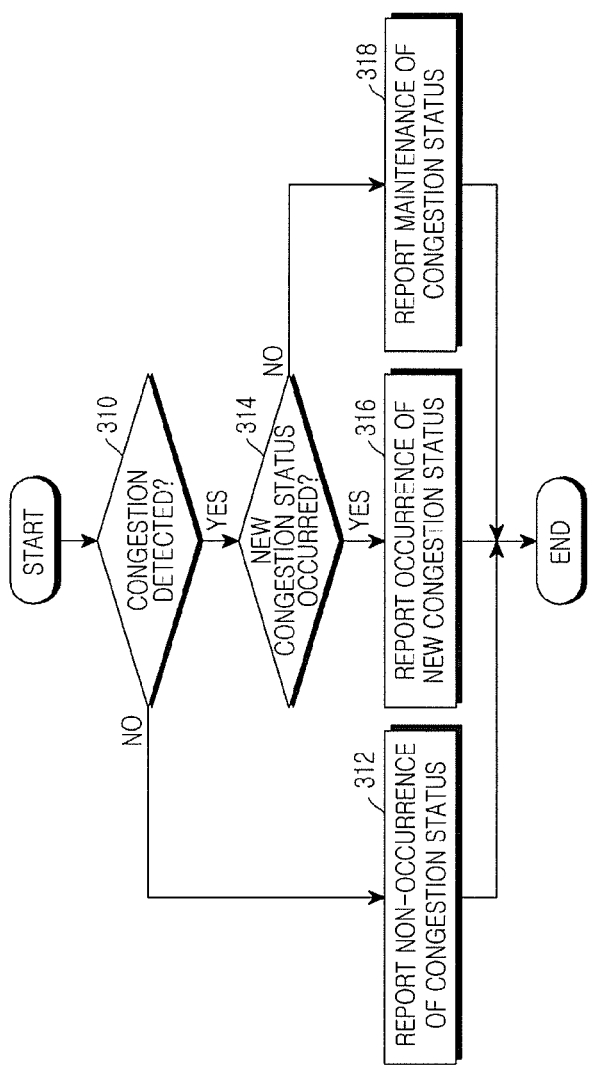
FIG. 3 is a diagram showing a control flow performed by a reception device to control data transmission in a wired transmission section according to an embodiment of the present invention.

FIG. 3 shows a control flow performed by a reception device to control data transmission in a wired transmission section according to an embodiment of the present invention.

Referring to FIG. 3, while receiving data from a transmission device through a wired transmission section, a reception device continuously checks a transmission/congestion status of the wired transmission section. In other words, the reception device monitors in step 310 whether congestion occurs in the wired transmission section.

If no congestion is detected in the wired transmission section in step 310, the reception device generates a congestion status report message reporting non-occurrence of a congestion status and sends the congestion status report message to the transmission device in step 312.

In a congestion status field of the congestion status report message being sent to the transmission device is recorded information indicating no detection of a congestion status. For example, "0" indicating non-occurrence of congestion in the wired transmission section is recorded in the congestion status field of the congestion status report message. A flag field for identifying a cause of the congestion status is unused.

Otherwise, if congestion is detected in the wired transmission section in step 310, the reception device determines in step 314 whether the detected congestion status corresponds to a new congestion status. That is, the reception device determines whether the transmission status in the wired transmission section has transitioned from a normal status to a congestion status, or a new congestion status has occurred for other reasons though it was in a congestion status before.

If it is determined in step 314 that a new congestion status has occurred, the reception device generates a congestion status report message reporting occurrence of a new congestion status and sends the congestion status report message to the transmission device in step 316.

In a congestion status field of the congestion status report message being sent to the transmission device is recorded information indicating the detection of a new congestion status. For example, if a cause of the occurrence of the new congestion status is a delay, congestion status information of "2" is recorded in the congestion status field of the congestion status report message. However, if a cause of the occurrence of the new congestion status is a loss, congestion status information of "3" is recorded in the congestion status field of the congestion status report message.

In the case of occurrence of a new congestion status, "1" indicating the occurrence of a new congestion status is recorded in a flag field of the congestion status report message regardless of the cause of the congestion.

However, if it is determined in step 314 that a new congestion status has not occurred, the reception device generates a congestion status report message reporting maintenance of the existing congestion status and sends the congestion status report message to the transmission device in step 318.

In a congestion status field of the congestion status report message being sent to the transmission device is recorded information about a cause of the maintenance of the congestion status, and in a flag field thereof is recorded information indicating that the current congestion status has been being maintained for a specific time.

For example, if a cause of the congestion status being maintained is a delay, congestion status information of "2" is recorded in the congestion status field of the congestion status report message, and if the cause is a loss, congestion status information of "3" is recorded in the congestion status field of the congestion status report message.

Regardless of the cause that the congestion status is being maintained, "0" indicating the maintenance of a congestion status is recorded in a flag field of the congestion status report message.

As can be appreciated from the above-described operation of a reception device, the reception device allows a transmission device to identify whether a new congestion status has occurred, or the existing congestion status is being maintained, depending on a flag field of a congestion status report message.

Meanwhile, the reception device sends a congestion station report message to the transmission device through the operation shown in FIG. 3, even when it receives a congestion status report request message from the transmission device. If a new congestion status caused by a delay is detected by checking DRT information recorded in a DRT field of the congestion status report request message, the reception device generates a congestion status report message for reporting the occurrence of the new congestion status and sends the congestion status report message to the transmission device. Adding the DRT field to the congestion status report request message is to allow the reception device to detect a delay in the wired transmission section upon receiving the congestion status report request message.

Figure 4:
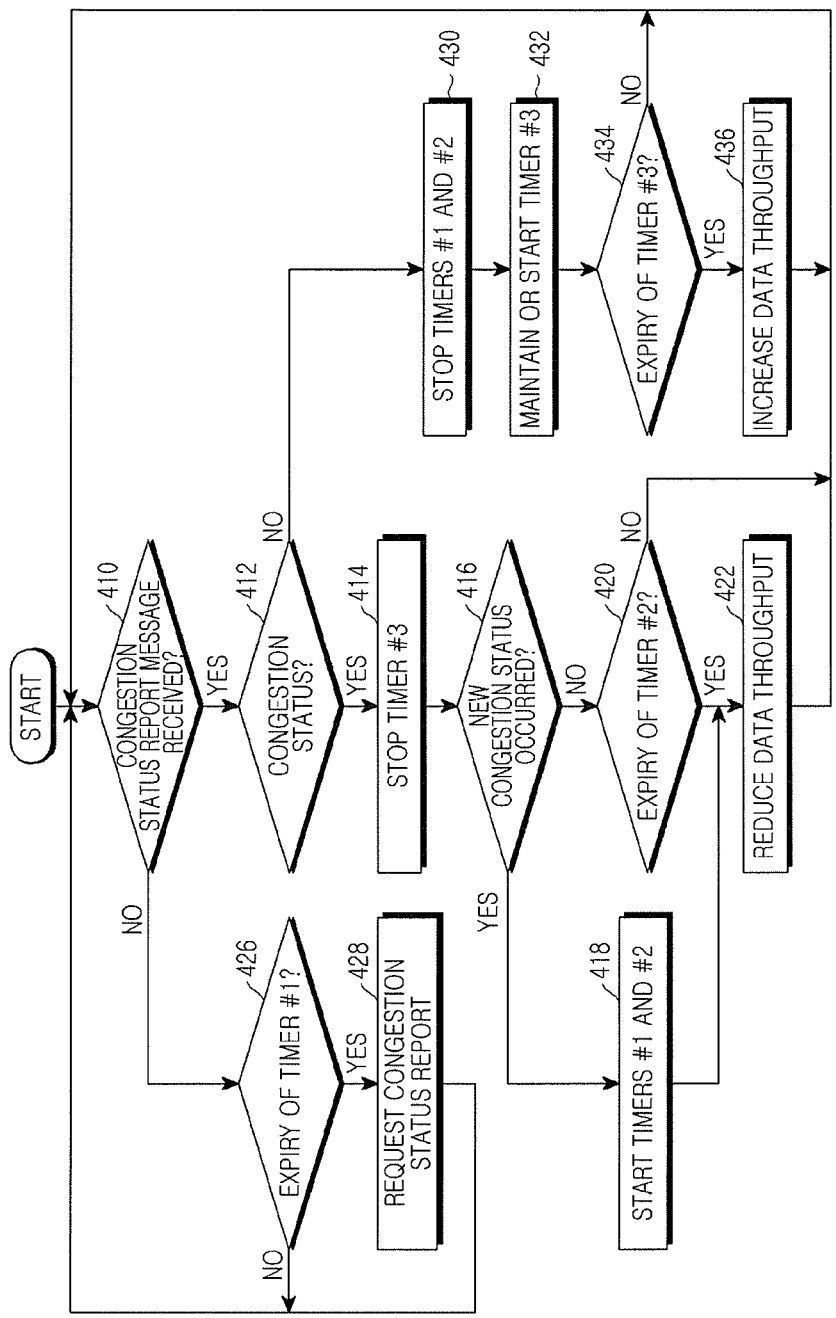
FIG. 4 is a diagram showing a control flow performed by a transmission device to control data transmission in a wired transmission section according to an embodiment of the present invention.

FIG. 4 shows a control flow performed by a transmission device to control data transmission in a wired transmission section according to an embodiment of the present invention.

Referring to FIG. 4, while transmitting data to a reception device through a wired transmission section, a transmission device determines in step 410 whether a congestion status report message is received from the reception device.

If no congestion status report message is received from the reception device, the transmission device determines in step 426 whether a first timer TNL_Congestion_Status_Request_Time has expired. The first timer starts when a report indicating occurrence of a new congestion status is received from the reception device, and then expires when a report indicating release of the congestion status is received from the reception device.

Therefore, using the first timer, the transmission device may monitor the time for which the congestion status is maintained without being released after occurrence of a new congestion status.

If the first timer has expired in step 426, the transmission device requests the reception device to report the current congestion status in step 428. That is, the transmission device sends a congestion status report request message to the reception device in step 428. The congestion status report request message has a DRT field, in which DRT information is recorded.

Sending by the transmission device a congestion status report request message upon expiry of the first timer is to determine that the congestion status has not been released despite a lapse of a predetermined time after occurrence of a new congestion status. In other words, this is to prepare for the situation where even though a congestion status report message reporting release of a congestion status was sent by the reception device, the transmission device has failed to normally receive the congestion status report message due to its loss during transmission.

If no report on the congestion status has been received from the reception device or the first timer has not expired, the transmission device returns to step 410 and monitors whether a congestion status report message is received from the reception device.

Upon receiving a congestion status report message from the reception device, the transmission device determines in step 412 whether the wired transmission section is now in a congestion status, based on information recorded in the received congestion status report message. That is, the transmission device determines whether the wired transmission section is now in a congestion status, based on congestion status information recorded in a congestion status field of the congestion status report message.

For example, the transmission device determines that the wired transmission section is in a congestion status, if congestion status information recorded in the congestion status field of the congestion status report message is "2" or "3". For example, the congestion status information="2" means a congestion status caused by a delay, and the congestion status information="3" means a congestion status caused by a loss.

However, if congestion status information recorded in the congestion status field of the congestion status report message is "0" or "1", the transmission device determines that the wired transmission section is not in a congestion status. For example, the congestion status information="0" means non-occurrence of congestion in the wired transmission section, and the congestion status information="0" means a reserved value unused for a congestion status.

If the wired transmission section is in a congestion status, the transmission device stops a third timer 'Rate_Increase_Timer' in step 414. The third timer is used to increase throughput of data if no congestion occurs in the wired transmission section for a predetermined time. Therefore, the third timer starts when a report indicating release of a congestion status is first received from the reception device, and expires when a report indicating occurrence of a congestion status is received from the reception device. Meanwhile, running of the third timer is maintained even though a congestion status report message reporting non-occurrence of a congestion status is received from the reception device after a start of the third timer.

However, if the third timer is not in an active status, the operation of stopping the third timer by the transmission device in step 414 is optional. Also, the transmission device may be adapted to implement step 414 when a report indicating occurrence of a new congestion status is received from the reception device. The reason is that when a congestion status already reported by the reception device is being maintained, running of the third timer was already stopped at the time the occurrence of a congestion status was first reported.

The transmission device determines in step 416 whether the congestion status having occurred in the wired transmission section is a new congestion status. That is, it can be assumed that a report indicating that the wired transmission section is in a normal status was received from the reception device by a previous congestion status report message, but a congestion status is reported by a next received congestion status report message.

However, separate measures should be prepared, given that a data loss may occur even in the wired transmission section from the reception device to the transmission device. For example, the transmission device may determine occurrence/non-occurrence of a new congestion status based on information recorded in a flag field of a received congestion reception report message. That is, if "0" is recorded in the flag field, the transmission device determines that the previous congestion status is being maintained, and if "1" is recorded in the flag field, the transmission device determines that a new congestion status has occurred. As defined above, the occurrence of a new congestion status means that a congestion status has occurred due to a delay or a loss of data while the wired transmission section was in a normal status before.

If a new congestion status has occurred, the transmission device starts the first timer and a second timer 'TNL_Congestion_Prohibit_Timer' in step 418. The second timer is used to check the time for which the congestion status is being maintained. That is, the second timer is used to prevent data throughput from decreasing every time a congestion status report message reporting a congestion status is received from the reception device. Therefore, the transmission device will not reduce throughput of data even though a congestion status report message reporting a congestion status is received, for a time period in which the second timer starts and expires. Meanwhile, a definition of the first timer has been made above.

After starting the first and second timers, the transmission device reduces throughput of data in step 422. The reduced amount of data throughput may be predetermined in advance, or determined depending on parameters included in a capacity allocation message from the reception device. The parameters included in the capacity allocation message mean parameters determining data throughput.

On the other hand, if it is determined in step 416 that a new congestion status has not occurred but the existing congestion status is being maintained, the transmission device determines in step 420 whether the second timer has expired. The expiry of the second timer means a lapse of a predetermined time after a start of the second timer.

If the second timer has expired, the transmission device reduces data throughput in step 422. However, if the second timer has not expired, the transmission device returns to step 410, discarding the congestion status report message received before from the reception device. The reason for reducing data throughput only when the congestion status is maintained for a predetermined time, is to consider a data transmission delay occurring in the wired transmission section, and also to prevent data throughput from abruptly decreasing when the congestion status is continuously maintained.

If the received congestion status report message indicates not occurrence of a congestion status, but release of a congestion status in step 412, the transmission device stops the running first and second timers in step 430.

However, if the first and second timers are not running or have already expired, the transmission device may skip step 430 of stopping the first and second timers. The first and second timers being not running mean that the previous status was not a congestion status.

In step 432, the transmission device maintains or starts the third timer. That is, the transmission device maintains running of the third timer if the third timer has been running, and starts the third timer if the third timer is not running. The third timer starts running at the time the congestion status is released, and expires at the time a congestion status occurs. The third timer is used to check a time period for which not a congestion status but a normal status is maintained.

Thereafter, the transmission device determines in step 434 whether the third timer has expired. That is, the transmission device determines whether a normal status is being maintained without a congestion status occurring in the wired transmission section, until a lapse of a predetermined time.

If data transmission is normally achieved in the wired transmission section for a predetermined time, the transmission device increases data throughput by a set level in step 436, determining that the status of the wired transmission section can sufficiently cover throughput of the data being transmitted. By doing so, it is possible to more efficiently use the limited resources in the wired transmission section.

However, if it is determined that the time preset by the third timer has not elapsed, the transmission device returns to step 410.

In accordance with the description made with reference to FIG. 4, the transmission device requests the reception device to report the current status if no congestion status report is received from the reception device until a lapse of a predetermined time after occurrence of a new congestion status (Steps 426 to 428). Though not shown in FIG. 4, however, the transmission device may request the reception device to report the current congestion status if no report indicating release of the congestion status is received from the reception device until a lapse of a predetermined time after a report indicating occurrence of a new congestion status was received from the reception device.

In addition, the transmission device reduces data throughput if a new congestion status occurs or a congestion status is maintained for a predetermined time (Steps 410 to 422). Furthermore, the transmission device increases data throughput if data transmission is normally carried out in the wired transmission section for a predetermined time (Steps 410 to 412 and Steps 430 to 436).

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for controlling data transmission by a transmission device in a wired transmission section in a wireless communication network, the method comprising:
   receiving congestion status information from a reception device;
   determining whether a congestion status in the wired transmission section corresponds to an occurrence of a new congestion status or a maintenance of an existing congestion status based on the received congestion status information;
   reducing a throughput of data being transmitted to the reception device through the wired transmission section in response to the congestion status in the wired transmission section corresponding to the new congestion status;
   determining whether the existing congestion status in the wired transmission section is maintained for a first predetermined time in response to the congestion status in the wired transmission section corresponding to the maintenance of the existing congestion status;
   reducing the throughput of the data being transmitted to the reception device through the wired transmission section in response to the existing congestion status being maintained for the first predetermined time; and
   increasing the throughput of the data being transmitted to the reception device through the wired transmission section in response to a non-occurrence, of the new congestion status and existing congestion status, maintained for a second predetermined time,
   wherein a cause of the new congestion status is different from a cause of the existing congestion status.

2. The method of claim 1, further comprising:
   requesting the reception device to report the congestion status when a report indicating release of the congestion status is not received from the reception device until a lapse of a third predetermined time after a report on occurrence of the new congestion status.

3. The method of claim 2, wherein a congestion status report request message for requesting the reception device to report the congestion status includes a Delay Reference Time (DRT).

4. The method of claim 1, wherein a congestion status report from the reception device comprises a congestion status report message including a congestion status field in which information about the occurrence or the non-occurrence of the congestion status and the cause of the occurrence of the congestion status is recorded and a flag field in which information for identifying the occurrence of the new congestion status or maintenance of the existing congestion status is recorded.

5. The method of claim 1, wherein the throughput of the data being transmitted to the reception device through the wired transmission section is reduced or increased depending on a parameter included in a capacity allocation message received from the reception device.

6. The method of claim 5, wherein the cause of the occurrence of the congestion status is one of a delay and a loss in the wired transmission section.

7. A method for controlling data transmission performed by a transmission device in a reception device in a wired transmission section in wireless communication network, the method comprising:
   detecting, by a reception device, whether a congestion status corresponds to an occurrence of a new congestion status or to a maintenance of an existing congestion status in the wired transmission section in receiving data from the transmission device through the wired transmission section;
   responsive to detecting the new congestion status, reporting, by the reception device, a congestion status information corresponding to the occurrence of the new congestion status in the wired transmission section to the transmission device;
   responsive to detecting maintenance of the existing congestion status, reporting, by the reception device, the maintenance of the existing congestion status in the wired transmission section to the transmission device;
   sending, to the transmission device, a capacity allocation message including a parameter required to reduce or increase throughput of data that the transmission device transmits through the wired transmission section in response to the reported congestion status information,
   wherein a cause of the new congestion status is different from a cause of the existing congestion status;
   in response to the existing congestion status being maintained for the first predetermined time, reducing the throughput of the data being transmitted to the reception device through the wired transmission section by the transmission device; and
   in response to a non-occurrence, of the new congestion status and existing congestion status, maintained for a second predetermined time increasing the throughput of the data being transmitted to the reception device through the wired transmission section by the transmission device.

8. The method of claim 7, further comprising:
   identifying a current congestion status in the wired transmission section upon receiving, from the transmission device, a request to report a congestion status; and
   reporting results of identifying the current congestion status to the transmission device.

9. The method of claim 7, further comprising:
   upon receiving, from the transmission device, a congestion status report request message for requesting to report a congestion status, identifying the occurrence or the non-occurrence of a congestion status due to a delay in the wired transmission section using a Delay Reference Time (DRT) included in the congestion status report request message; and
   reporting results of identifying the occurrence or non-occurrence of the congestion status to the transmission device.

10. The method of claim 7, wherein a congestion status report to the transmission device comprises a congestion status report message including a congestion status field in which information about occurrence or non-occurrence of a congestion status and a cause of occurrence of the congestion status is recorded and a flag field in which information for identifying occurrence of a new congestion status or maintenance of an existing congestion status is recorded.

11. The method of claim 7, wherein the cause of occurrence of the congestion status is one of a delay and a loss in the wired transmission section.

12. A wireless communication system for controlling data transmission in a wired transmission section, the wireless communication system comprising:
   a reception device configured to identify whether a congestion status corresponds to an occurrence of a new congestion status or to a maintenance of an existing congestion status in receiving data through the wired transmission section, to report flag information for identifying the occurrence of the new congestion status and the maintenance of the existing congestion status according to the identification results, and to send a capacity allocation message including a parameter required to reduce or increase throughput of the data that the transmission device transmits through the wired transmission section in response to the congestion status report message; and
   a transmission device configured to receive congestion status information from a reception device, reduce the throughput of data being transmitted through the wired transmission section when the received congestion status information is comprised flag information corresponding to the occurrence of the new congestion status, determine the existing congestion status in the wired transmission section is maintained for a first predetermined time when the received congestion status information comprises flag information corresponding to the maintenance of the existing congestion status, reduce the throughput of data being transmitted through the wired transmission section when the existing congestion status is being maintained for the first predetermined time, and increase the throughput of data being transmitted to the reception device through the wired transmission section, when non-occurrence of the congestion status, identified from the congestion status report message, is maintained for a second predetermined time,
   wherein a cause of the new congestion status is different from a cause of the existing congestion status.

13. The wireless communication system of claim 12, wherein the transmission device is further configured to request the reception device to report the congestion status when a report indicating release of the congestion status is not received from the reception device until a lapse of a third predetermined time after a report on occurrence of the new congestion status.

14. The wireless communication system of claim 13, wherein a congestion status report request message for requesting the reception device to report the congestion status includes a Delay Reference Time (DRT).

15. The wireless communication system of claim 14, wherein upon receiving, from the transmission device, a congestion status report request message, the reception device is further configured to identify occurrence or non-occurrence of a congestion status due to a delay in the wired transmission section using a Delay Reference Time (DRT) included in the congestion status report request message, and the identification report results of the occurrence or non-occurrence of the congestion status to the transmission device.

16. The wireless communication system of claim 12, wherein a congestion status report from the reception device comprises a congestion status report message including a congestion status field in which information about occurrence non-occurrence of a congestion status and a cause of occurrence of the congestion status is recorded and a flag field in which information for identifying occurrence of a new congestion status or maintenance of an existing congestion status is recorded.

17. The wireless communication system of claim 12, wherein:
   the reception device is further configured to send a capacity allocation message including a parameter required to reduce or increase throughput of data to be transmitted through the wired transmission section; and
   the transmitter is further configured to reduce or increase throughput of data to be transmitted through the wired transmission section based on the parameter included in the capacity allocation message received from the reception device.

18. The wireless communication system of claim 17, wherein the cause of occurrence of the congestion status is one of a delay and a loss in the wired transmission section.

* * * * *